United States Patent [19]
Van Der Broeck

[11] Patent Number: 5,446,361
[45] Date of Patent: Aug. 29, 1995

[54] CIRCUIT ARRANGEMENT FOR POWERING A TWO-PHASE ASYNCHRONOUS MOTOR

[75] Inventor: Heinz Van Der Broeck, Zülpich, Germany

[73] Assignee: U.S. Philips Corporation, New York, N.Y.

[21] Appl. No.: 125,993

[22] Filed: Sep. 23, 1993

[30] Foreign Application Priority Data

Sep. 25, 1992 [DE] Germany .................. 42 32 134.4

[51] Int. Cl.⁶ .................................................. H02P 7/00
[52] U.S. Cl. .................................... 318/747; 318/439
[58] Field of Search ................. 318/727, 747–749, 318/778, 779, 781, 798–815, 254, 138, 439; 363/41–46, 49

[56] References Cited

U.S. PATENT DOCUMENTS

| | | | |
|---|---|---|---|
| 2,527,718 | 10/1950 | Grass | 318/747 |
| 2,671,877 | 3/1954 | Stewart, Jr. | 318/747 |
| 4,081,727 | 3/1978 | Green | 318/747 |
| 4,137,488 | 1/1979 | Sibalis | 318/778 |
| 4,160,196 | 7/1979 | Ismatkhodzhaev et al. | 318/749 |
| 4,584,505 | 4/1986 | Chung et al. | 318/254 |
| 4,774,448 | 9/1988 | Yoshitomi | 318/808 X |
| 5,216,348 | 6/1993 | Ito | 318/696 |
| 5,218,283 | 6/1993 | Wills et al. | 318/748 |

FOREIGN PATENT DOCUMENTS 0408458 1/1991 European Pat. Off. .

OTHER PUBLICATIONS

"Phase–Difference Control of 2-Phase Inverter–Fed Induction Motor", by Jang et al, IEEE 1989, CH2721-9-89-0000, pp. 571-578.

Primary Examiner—Jonathan Wysocki
Attorney, Agent, or Firm—Laurie Gathman

[57] ABSTRACT

A circuit arrangement for powering a two-phase asynchronous motor having two windings which each have one end connected to one anode and both have another end connected to a third node, the nodes each being arranged to receive one of three alternating voltages whose sinusoidal fundamental waves at least substantially correspond in frequency. In this circuit arrangement, the power dissipation in the switching circuit connected to the third node is reduced by the alternating voltage applied to the third node having constant levels in periodically recurring time intervals so as to obtain a more economical dimensioning without a deterioration of the operating characteristics, particularly the loadability.

24 Claims, 3 Drawing Sheets

CIRCUIT ARRANGEMENT FOR POWERING A TWO-PHASE ASYNCHRONOUS MOTOR

BACKGROUND OF THE INVENTION

The invention relates to a circuit arrangement for powering a two-phase asynchronous motor comprising two windings which each have one end connected to one node and which both have another end connected to a third node, the nodes each being arranged to receive one of three alternating voltages whose sinusoidal fundamental waves at least substantially correspond in frequency.

U.S. Pat. No. 4,829,551 discloses a two-phase drive for a rotating anode of an x-ray tube having a stator comprising two windings: a main winding and an auxiliary winding. The main winding and the auxiliary winding are connected to three nodes, one of which is common to both windings. The three nodes are driven with a main signal, a common signal and an auxiliary signal, respectively, and for this purpose they are connected to switching circuits for applying these signals. According to U.S. Pat. No. 4,829,551 these switching circuits comprise Darlington transistors.

The paper "Phase-Difference Control of 2-Phase Inverter-Fed Induction Motor", CH 2721-9/89/0000-0571 (1989) IEEE by Jang, Cha, Kim and Won describes the drive of an induction motor with pulse-width modulated rectangular voltages simulating sinewave voltages.

During operation of a two-phase asynchronous motor the switching circuits for applying the alternating voltages to the nodes are loaded differently in such a manner that the switching circuit connected to the third node must take the highest load, whereas the switching circuits connected to the first two nodes are loaded differently but to a smaller extent depending on the dimensioning of the windings to which they are connected. These different loads lead to different dissipations in the switching circuits, the switching circuit connected to the third node having the highest dissipation as a result of the larger current to be applied thereto. These losses occur not only in the case of a linear power supply with sinusoidal alternating voltages but also occur in the case of power supply with pulse-width modulated rectangular voltages, i.e. in the latter case mainly during the switching operations. Thus, in the case of such a drive the individual switching circuits should be dimensioned for different power dissipations.

On the other hand, standard devices are available which combine three switching circuits for driving the three winding nodes of three-phase asynchronous motors. Preferably, the individual switching circuits of these standard devices are dimensioned identically. If for economical reasons such a standard device is to be used for the construction of a circuit arrangement of the type defined in the opening paragraph the dimensioning of this entire device should be based on the load of the switching circuit connected to the third node. The two other switching circuits are then overdimensioned so that altogether the construction is not economical. Particularly in the case of apparatuses to be manufactured in large quantities at low cost the use of such a switching circuit would be unfavourable.

SUMMARY OF THE INVENTION

It is an object of the invention to construct a circuit arrangement of the type defined in the opening paragraph in such a manner that the power dissipation in the switching circuit connected to the third node can be reduced so as to achieve a more economical dimensioning without: a deterioration of the operating characteristics, particularly the loadability.

According to the invention this object is achieved in that the alternating voltage to be applied to the third node assumes constant levels in periodically recurring time intervals.

Such a drive of the third node means that the basic waveform of the alternating voltage to be applied to the third node, which at least substantially corresponds to the waveforms of the alternating voltages on the two other nodes, is interrupted in given time intervals in order to insert constant voltage levels. In the case of power supply from a direct voltage source this level preferably corresponds to the voltages on the terminals of this direct voltage source.

In the case of an otherwise linear sinusoidal drive of the nodes of the windings the modification of the waveforms of the alternating voltages in accordance with the invention means that the sinusoidal shape of the alternating voltage on the third node is interrupted in said intervals, which appear periodically, preferably at the frequency of the sinusoidal alternating voltages, and that instead during this interval the alternating voltage on the third node assumes the constant level, preferably that on one of the terminals of the direct voltage source providing the power supply. This is in order to achieve a low impedance and hence a low dissipation of the switching circuit for the alternating voltage driving the third node. As a result, the power dissipation in said time intervals is reduced considerably and averaged in time it is reduced so far that it is comparable to the dissipations in the two other switching circuits, so that these switching circuits can be dimensioned accordingly.

If the alternating voltages are essentially pulse-width modulated rectangular voltages the alternating voltage to be applied to the third node also assumes constant levels interrupting the pulse width modulation in the periodically recurring time intervals, which levels may also correspond to the voltages on the terminals of a direct voltage source used for the power supply. Thus, the switching operations in these time intervals, which give rise to losses, are dispensed with, so that in this embodiment the losses in the switching circuits are also reduced. Preferably, the constant levels then correspond to the peak values of the pulse-width modulated rectangular voltages. In particular, the peak values of the pulse-width modulated rectangular voltages then also correspond to the voltages on the terminals of the direct voltage source in the manner which is customary in pulse-width modulation.

Very favourable conditions for powering the two-phase asynchronous motor are obtained in that the alternating voltage to be applied to the third node assumes a positive or a negative constant level in the time intervals in which the sinusoidal fundamental wave of the alternating voltage on the third node is larger and smaller, respectively, than the sinusoidal fundamental waves of the alternating voltages on the two other nodes. In the present embodiment the alternating voltage to be applied to the third node can be processed in accordance with the invention without any problems for all the waveforms of the alternating voltages described above. This becomes apparent in particular if, in accordance with another embodiment of the invention, a compensation voltage is superposed on each of the alternating voltages to be applied to the first two nodes, which compensation voltage corresponds to the change of the voltage waveform caused by the insertion of constant levels into the voltage to be applied to the third node, so as to compensate for the influence of this change on the voltages to be applied to the windings. These compensation voltages ensure that the waveforms of the voltages across the windings remain unchanged as compared with the customary power supply so that the power supply in accordance with the invention cannot affect the motor and the apparatus operated by this motor. However, the compensation voltages may give rise to a considerably higher amplitude of the alternating voltages to be applied to the first two nodes, although the amplitude of their fundamental waves remains the same. The above dimensioning of the time intervals in which constant levels are applied to the third node ensures that the amplitudes of the alternating voltages to be applied to the first two nodes do not exceed the amplitude of the alternating voltage to be applied to the third node. Thus, with the power supply in accordance with the invention it is also possible to derive all three alternating voltages simply from a common direct voltage source whose terminals carry the voltages corresponding to the constant levels. The need for a higher voltage is thus avoided, which voltage would have to be generated separately with additional means and could also give rise to additional insulating problems at the motor and, in addition, allowance would have to be made for the fact that the circuit arrangement used for the power supply should exhibit a correspondingly higher dielectric strength.

Suitably, the sinusoidal fundamental waves of the alternating voltages to be applied to the first two nodes are in phase opposition and the phase angle of the alternating voltage to be applied to the third node can be given an arbitrary value. The amplitude ratio of the voltages across the windings of the two-phase asynchronous motor can then be adjusted simply by preselection of the phase angle and can thus be adapted very easily to different modes of operation or constructions of such motors. In this way motors having an arbitrary asymmetry between a main winding and an auxiliary winding can be driven using minimal technical means, the phase angle between the voltages across these windings being always 90°.

BRIEF DESCRIPTION OF THE DRAWINGS

Embodiments of the invention will now be described in more detail, by way of example, with reference to the drawings. In the drawings.

DESCRIPTION OF THE PREFERRED EMBODIMENT

Figure 1:
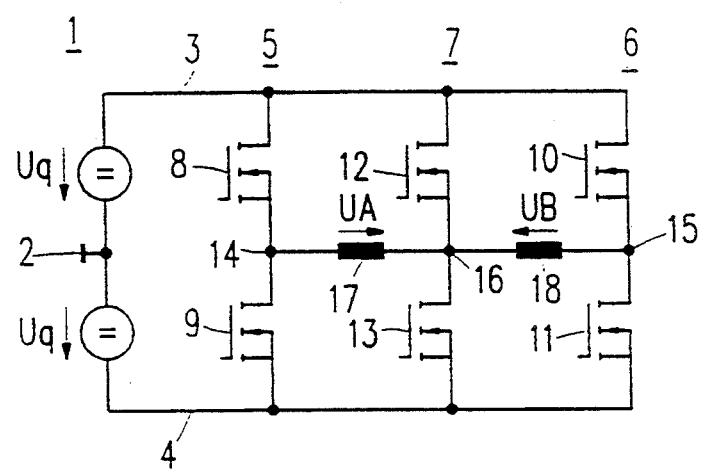
FIG. 1 is a circuit diagram of an example of a power supply for a two-phase asynchronous motor.

FIG. 1 is a schematic circuit diagram for a circuit arrangement by means of which the two-phase asynchronous motor can be powered advantageously in a manner as shown in FIGS. 2 and 3 but particularly as shown in FIG. 3. This circuit arrangement comprises a direct voltage source 1, which for simplicity is shown in FIG. 1 as a series arrangement of two sources which each supply a direct voltage Uq and whose node is coupled to earth 2. On its terminals 3 and 4 the direct voltage source 1 supplies a positive voltage UQ and a negative voltage −UQ relative to earth potential (potential on 2). The direct voltage source 1 may comprise a mains rectifier, a switched power supply, a battery or the like.

Ends of three switch sections 5, 6 and 7, which each comprise two series-connected switch stages 8, 9; 10, 11 and 12, 13, respectively, are connected to the terminals 3, 4 of the direct voltage source 1. In the example shown in FIG. 1 each of the switch stages 8 to 13 comprises a field-effect transistor whose source-drain path forms a current path for the currents to be applied to the two-phase asynchronous motor. For this purpose the drain terminal of the field-effect transistor of the first switch stage 8, 10 or 12 is connected to the positive terminal 3 of the direct voltage source 1 and the source terminal of the field-effect transistor of the second switch stage 9, 11 or 13 is connected to the negative terminal 4 of the direct voltage source 1 in each of the switch sections 5, 6 and 7, respectively. Moreover, in each of the switch sections 5, 6 and 7 the source terminal of the field-effect transistor of the first switch stage 8, 10 or 12 is connected to the drain terminal of the field-effect transistor of the associated second switch stage 9, 11 or 13. The last-mentioned connection forms the first, the second and the third node 14, 15 and 16, respectively. A main winding 17 of the two-phase asynchronous motor is connected between the first node 14 and the third node 16 and an auxiliary winding 18 of this motor is connected between the second node 15 and the third node 16.

The switch sections 5, 6 and 7 serve to apply three alternating voltages U1, U2 and U3, respectively, to the nodes 14, 15 and 16, respectively. The difference between the first alternating voltage U1 on the first node 14 and the third alternating voltage U3 on the third node 16 forms a voltage UA across the main winding 17, and the difference between the second alternating voltage U2 on the second node 15 and the third alternating voltage U3 on the third node 16 forms a voltage UB across the auxiliary winding 18. By an appropriate control of the switch stages 8 to 13 different waveforms are obtained for the alternating voltages U1 to U3. The circuit arrangement shown in FIG. 1 is only one of several equally suitable possibilities. The two-phase asynchronous motor can, for example, also be powered with three sinusoidal voltages supplied directly by three suitably selected alternating voltage sources.

The diagram shown in FIG. 2 shows the three alternating voltages U1 to U3 as well as the voltages UA and UB across the windings 17 and 18 as functions of time in the case that the two-phase asynchronous motor is powered with sinusoidal alternating voltages. These sinusoidal voltages U1 to U3 are shown together in FIG. 2d) in the correct phase relationship to illustrate their phases relative to one another. The alternating voltage U2 applied to the second node U2 is phase-shifted by one half-cycle, i.e. through a phase angle of 180°, relative to the alternating voltage U1 applied to the first node 14. The alternating voltages U1 and U2 are consequently in phase opposition. In contrast, the phase angle of the alternating voltage U3 applied to the third node 16 may have an arbitrary value. In the situation shown in FIG. 2 a phase shift $\delta$ of 120° relative to the first alternating voltage U1 has been selected. This simplifies the drawing but it is also possible to use any other value for the phase angle $\delta$.

Figure 2A:
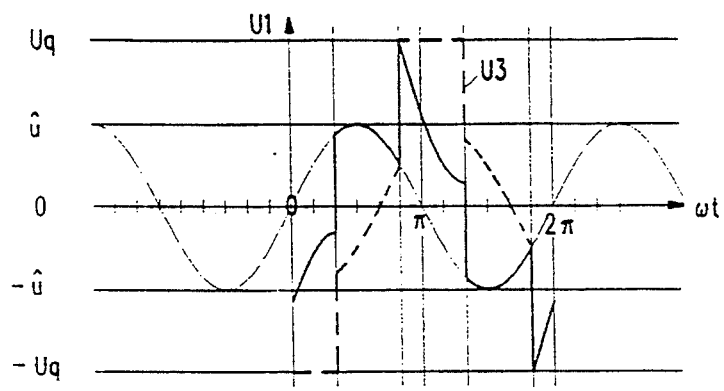
FIG. 2a shows the alternating voltage U1 with a superimposed compensation voltage when the two phase asynchronous motor is powered with sinusoidal voltages.
Figure 2B:
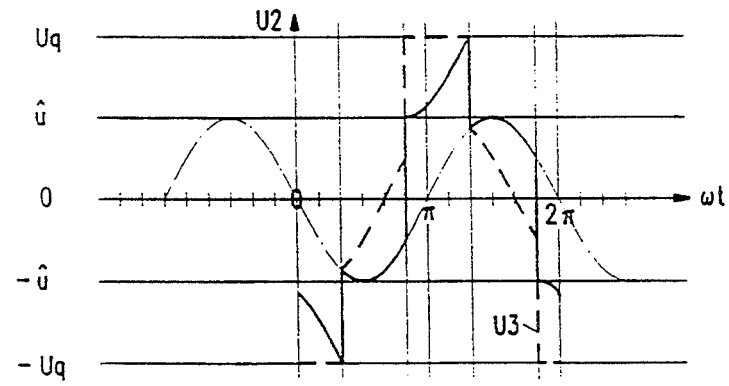
FIG. 2b shows the alternating voltage U2 with a superimposed compensation voltage when the two phase asynchronous motor is powered with sinusoidal voltages.
Figure 2C:
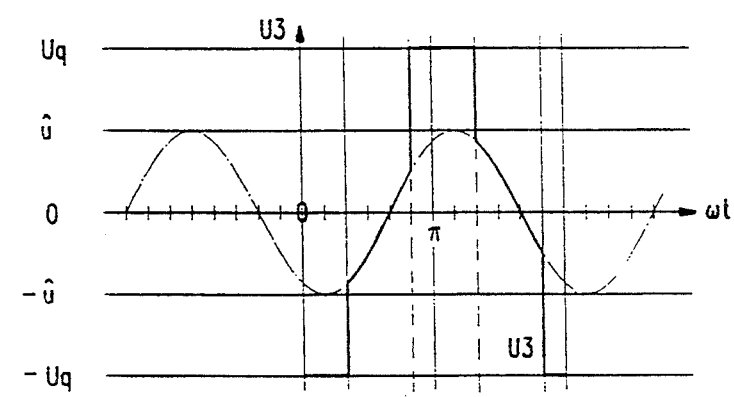
FIG. 2c shows the waveform of the third alternating voltage U3 when the two phase asynchronous motor is powered with sinusoidal voltages.
Figure 2D:
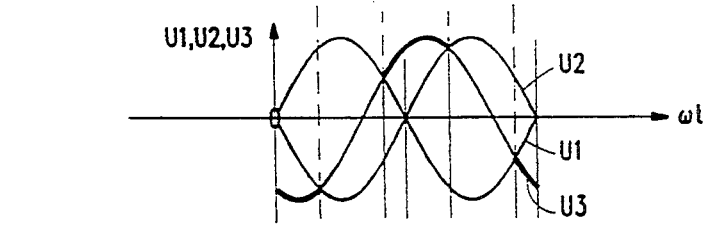
FIG. 2d shows the fundamental waves, and their phase relationship to one another, of the alternating voltages U1, U2 and U3 when the two phase asynchronous motor is powered with sinusoidal voltages.

The alternating voltages U1 to U3 shown in FIG. 2d) have a similar amplitude û are plotted as a function of time, the time axis bearing the designation for the phase $\omega t$. These sinusoidal waveforms of the alternating voltages U1 to U3 will also be referred to hereinafter as fundamental waves, to which reference is made in the case of different waveforms of the alternating voltages used for powering the two-phase asynchronous motor in other examples.

In FIG. 2d) the time intervals in which the sinewave U3 (i.e. the fundamental wave) is larger or smaller than the sinewaves U1 and U2, in contrast with the other time intervals, are shown in heavy lines. The relevant time intervals are the intervals or corresponding phases $\omega t$ between 0 and $2\pi/6$, between $5\pi/6$ and $8\pi/6$, and between $11\pi/6$ and $2\pi$, periodically repeated every $2\pi$. In these time intervals, in accordance with the invention, the sinusoidal shape of the third alternating voltage U3 is replaced by a voltage of constant level Uq or $-$Uq, resulting in the waveforms shown in FIG. 2c). The fundamental sinewave for the alternating voltage U3 is shown in broken lines for comparison. In accordance with the invention, the third alternating voltage U3 is set at a positive level in the time interval in which the fundamental wave of the third alternating voltage U3 is larger than the fundamental waves of the two other alternating voltages, whereas it is set at a negative level $-$Uq in the time interval in which the fundamental wave of the third alternating voltage U3 is smaller than the fundamental waves of the other alternating voltages.

Figure 2E:
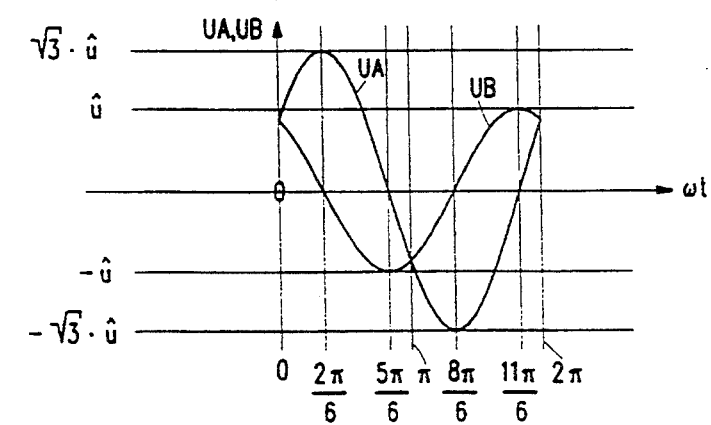
FIG. 2e shows the voltage UA across the main winding 17 of FIG. 1, and voltage UB across the auxiliary winding 18 of FIG. 1 when the two phase asynchronous motor is powered with sinusoidal voltages.

Although the alternating voltages U1, U2 may remain unchanged to power the two-phase asynchronous motor, this will lead to changed waveforms for the voltages UA, UB across the windings 17, 18. These voltages UA, UB are shown by way of example in FIG. 2e) for the case that a two-phase asynchronous motor is powered with undisturbed fundamental sinewaves U1 to U3. For the phase shift $\delta$ of 120° between U1 and U3 selected in the present example the voltage UA across the main winding 17 will be a sinewave with a phase lead of $\pi/6$ relative to the alternating voltage U1 and with an amplitude corresponding to the amplitude û of the alternating voltages U1 to U3 multiplied by the square root of 3, whereas the voltage UB across the auxiliary winding 18 has a phase lead of $2\pi/6$, which corresponds to 120°, relative to the first alternating voltage U1 and has the amplitude û. These waveforms are shown in FIG. 2e).

If now, in accordance with the invention, the waveform of the third alternating voltage U3 shown in FIG. 2c) is selected the waveforms of the voltages UA and UB will also change. However, this may have adverse effects on the operation of the two-phase asynchronous motor. In order to eliminate these effects compensation voltages are superposed on the alternating voltages U1 and U2, which compensation voltages correspond to the difference between the waveform of the third alternating voltage U3 in accordance with the invention and the sinusoidal fundamental wave of this voltage and consequently compensate for the effect of the change of the third alternating voltage U3 on the formation of the voltages UA and UB. The waveforms of the voltages UA, UB thus remain unchanged and remain as in the selected example shown in FIG. 2e). FIGS. 2a) and 2b) show the alternating voltages U1, U2 with the superimposed compensation voltages for the selected example of a power supply with alternating voltages with sinusoidal fundamental waves as shown in FIG. 2d).

In the present example the amplitude û of the alternating voltages U1 to U3 is equal to half the direct voltage Uq. This value has been selected arbitrarily and may be any value between 0 and the value Uq as long as the alternating voltages U1 to U3 are derived from the direct voltage source 1 by means of a circuit arrangement as shown in FIG. 1. However, in any case the peak value of the voltages U1 to U3 will neither exceed the limits Uq and $-$Uq after superposition of the compensation voltages. Thus it remains possible to power the two-phase asynchronous motor with the voltages shown in FIG. 2 by means of the direct voltage source 1. This requires merely an appropriate control of the switch stages 8 to 13 but not an additional power source.

FIG. 3 shows as a further example the waveforms, plotted versus the phase $\omega t$, of the three alternating voltages U1, U2 and U3 as well as the voltages UA, UB across the windings of the two-phase asynchronous motor when powered with pulse-width modulated rectangular voltages. This method of powering is effected advantageously by means of a circuit arrangement as shown in FIG. 1. The nodes 14, 15 and 16 are then alternately connected to the positive terminal 3 and the negative terminal 4 of the direct voltage source via the switch stages 8 to 13, so that they alternately receive a voltage UQ and $-$UQ. By means of the duty cycle of this change-over between the two voltages applied to the terminals 3, 4 of the direct voltage source 1, i.e. by means of the modulation depth of the pulse-width nodulated rectangular voltage, it is possible to dictate the average value of the rectangular voltage taken over one switching period of the change-over between the voltages UQ and −UQ. In the example shown in FIG. 3 the modulation depth is 0.6. Pulse-width modulation is basically effected with a sinusoidal fundamental wave for the three alternating voltages U1, U2 and U3. These fundamental waves are again based on the phase relationships in accordance with FIG. 2d).

Figure 3A:
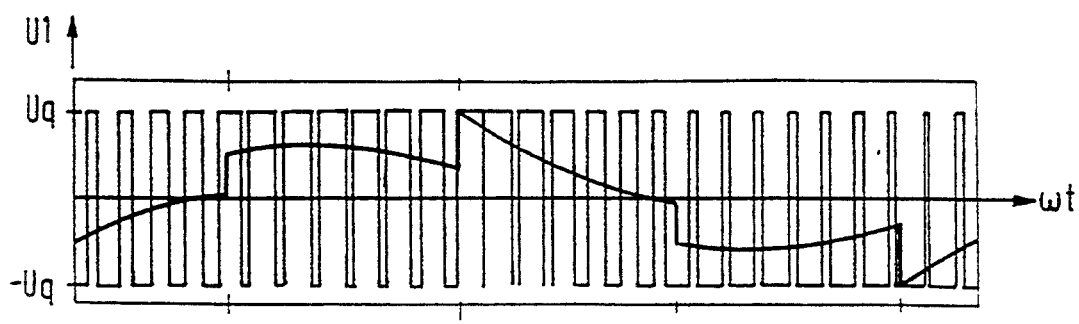
FIG. 3a shows the short-time average of voltage U1 when the two phase asynchronous motor is powered with pulse-width modulated rectangular voltages.
Figure 3B:
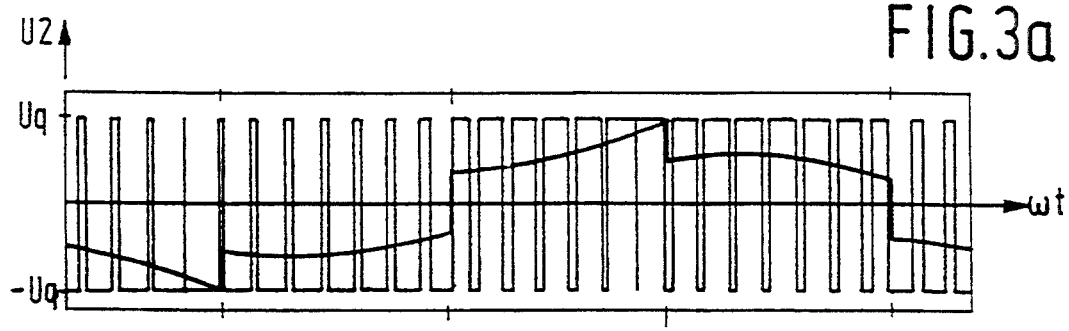
FIG. 3b shows the short-time average of voltage U2 when the two phase asynchronous motor is powered with pulse-width modulated rectangular voltages.

Contrary to the purely sinusoidal pulse-width modulation of the alternating voltages U1 to U3 FIG. 3a) shows a waveform for the third alternating voltage U3 as obtained in accordance with the invention. Thus, the switching operations for generating the rectangular voltage have been interrupted in the time intervals already defined with reference to FIG. 2d) and the third alternating voltage U3 assumes a constant level UQ or −UQ in these time intervals. In these time intervals the average value taken over one period of the rectangular voltages no longer corresponds to a sinewave but to the inserted constant level. The voltage obtained by averaging is also shown in the diagram for the alternating voltage U3 in FIG. 3c). Its waveform corresponds to that of the alternating voltage U3 in FIG. 2c) because the power supply with the pulse-width modulated rectangular voltages has been selected in such a manner that again an exactly sinusoidal power supply is obtained for the short-time average.

However, in order to achieve that for the short-time average again continuous sinewaves are obtained for the voltages UA and UB across the windings of the two-phase asynchronous motor when powered with pulse-width modulated rectangular voltages the pulse-width modulation of the rectangular voltages U1 and U2 shown in FIGS. 3a) and b) has been modified by means of the compensation voltages already described with reference to FIGS. 2a) and b). The short-time averages of these voltages U1 and U2 again yield the waveforms shown in FIGS. 3a) and b), which again correspond to the respective waveforms in the case of power supply with linear continuous alternating voltages, i.e. the waveforms shown in FIGS. 2a) and b).

Figure 3C:
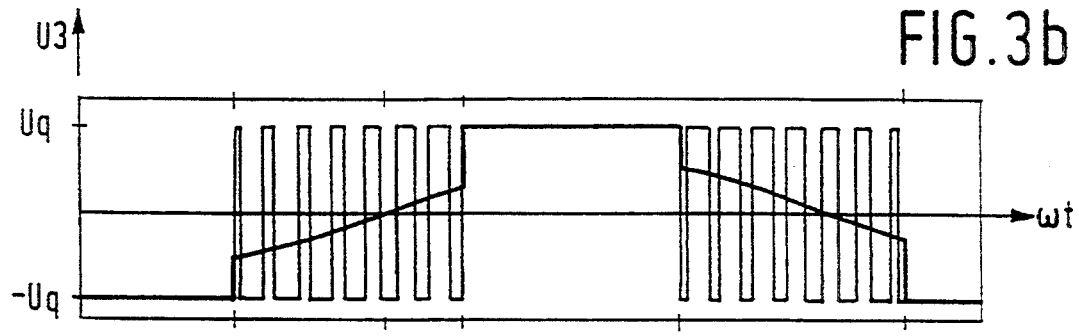
FIG. 3c shows the short-time average of voltage U3 when the two phase asynchronous motor is powered with pulse-width modulated rectangular voltages.
Figure 3D:
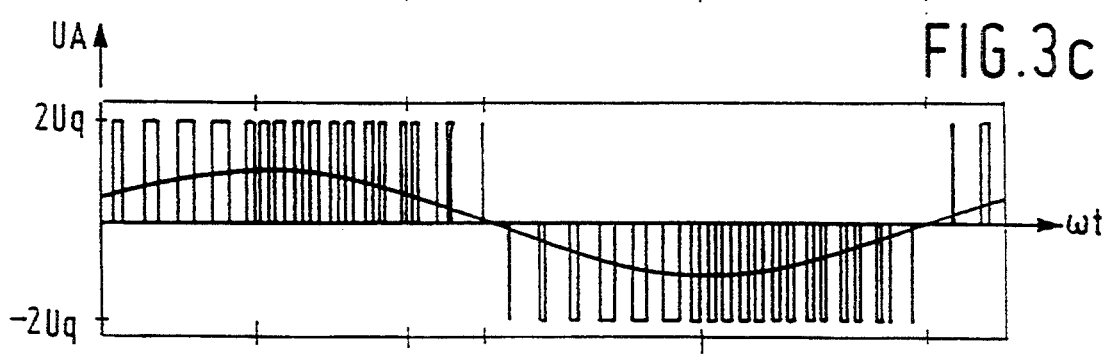
FIG. 3d shows the rectangular voltage UA across the main winding 17 of FIG. 1 when the two phase asynchronous motor is powered with pulse-width modulated rectangular voltages.
Figure 3E:
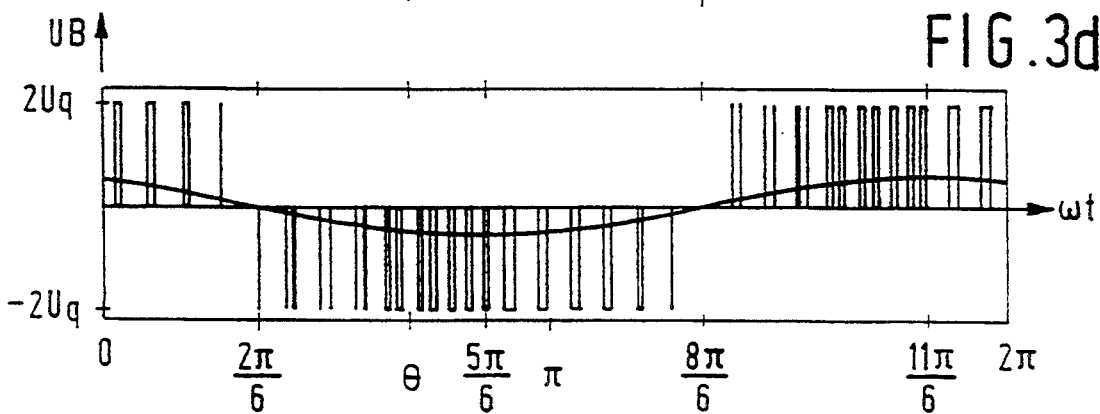
FIG. 3e shows the rectangular voltage UB across the auxiliary winding 18 of FIG. 1 when the two phase asynchronous motor is powered with pulse-width modulated rectangular voltages.

FIGS. 3d) and e) show the rectangular voltages UA across the main winding 17 and UB across the auxiliary winding 18 of the two-phase asynchronous motor when powered with the pulse-width modulated rectangular voltages U1 to U3. These diagram also show the short-time averages of the rectangular voltages, which are continuous sinewaves. Again they correspond to the waveforms shown in FIG. 2e).

A comparison between FIGS. 3a) and b) and FIG. 3c) shows that for the alternating voltage U3 the number of switching operations, i.e. the change of the rectangular voltage from one level to the other, is equal to only approximately half the number of switching operations for the alternating voltages U1 and U2. This yields a substantial reduction of the switching losses of the common third switch section 7, which provides compensation for the transmission losses now occurring as a result of an increased current flow. Altogether, this makes it possible to divide the thermal load of the three switch sections 5, 6, 7 more uniformly and, accordingly, to dimension the switch sections more economically.

I claim:

1. A circuit arrangement for powering a two-phase asynchronous motor comprising two windings which each have an end connected to a first node and a second node respectively and which both have a common end connected to a third node, the nodes each being arranged to receive one of, a first alternating voltage, a second alternating voltage and a third alternating voltage whose sinusoidal fundamental waves at least substantially correspond in frequency, characterized in that the third alternating voltage to be applied to the third node assumes constant levels (+Uq, −Uq) in periodically recurring time intervals.

2. A circuit arrangement as claimed in claim 1, characterized in that the alternating voltages are essentially pulse-width modulated rectangular voltages, the third alternating voltage to be applied to the third node assuming constant levels (+Uq, −Uq), which interrupt the pulse-width modulation, in the periodically recurring time intervals of 0 to $2\pi/6$, $5\pi/6$ to $8\pi/6$, $11\pi/6$ to $2\pi$.

3. A circuit arrangement as claimed in claim 2, characterized in that the constant levels (+Uq, −Uq) correspond to the peak values of the pulse-width modulated rectangular alternating voltages.

4. A circuit arrangement as claimed in claim 1, characterized in that the third alternating voltage to be applied to the third node assumes a positive (+Uq) or a negative (−Uq) constant level in the time intervals in which the sinusoidal fundamental wave of the alternating voltage on the third node is larger and smaller, respectively, than the sinusoidal fundamental waves of the first and second alternating voltages on the first and second nodes.

5. A circuit arrangement as claimed in claim 4, characterized in that the sinusoidal fundamental waves of the first and second alternating voltages to be applied to the first and second nodes are in phase opposition and the phase angle $\Theta$ of the third alternating voltage to be applied to the third node can be given an arbitrary value.

6. A circuit arrangement as claimed in claim 5, characterized in that a compensation voltage is superposed on each of the first and second alternating voltages to be applied to the first and second nodes, which compensation voltage corresponds to the change of the voltage waveform caused by the insertion of the constant levels (+Uq, −Uq) into the third voltage to be applied to the third node, so as to compensate for the influence of this change on the voltages to be applied to the windings.

7. A circuit arrangement as claimed in claim 2, characterized in that the alternating voltage to be applied to the third node assumes a positive (+Uq) or a negative (−Uq) constant level in the time intervals (0 to $2\pi/6$ and $11\pi/6$ to $2\pi$, $5\pi/6$ to $8\pi/6$, respectively) in which the sinusoidal fundamental wave of the alternating voltage on the third node is larger and smaller, respectively, than the sinusoidal fundamental waves of the alternating voltages on the two other nodes.

8. A circuit arrangement as claimed in claim 3, characterized in that the alternating voltage to be applied to the third node assumes a positive (+Uq) or a negative (−Uq) constant level in the time intervals (0 to $2\pi/6$ and $11\pi/6$ to $2\pi$, $5\pi/6$ to $8\pi/6$, respectively) in which the sinusoidal fundamental wave of the alternating voltage on the third node is larger and smaller, respectively, than the sinusoidal fundamental waves of the alternating voltages on the two other nodes.

9. A circuit arrangement as claimed in claim 2, characterized in that the sinusoidal fundamental waves of the first and second alternating voltages to be applied to the first and second nodes are in phase opposition and the phase angle $\Theta$ of the third alternating voltage to be applied to the third node can be given an arbitrary value.

10. A circuit arrangement as claimed in claim 3, characterized in that the sinusoidal fundamental waves of the first and second alternating voltages to be applied to the first and second nodes are in phase opposition and the phase angle Θ of the third alternating voltage to be applied to the third node can be given an arbitrary value.

11. A circuit arrangement as claimed in claim 4, characterized in that the sinusoidal fundamental waves of the first and second alternating voltages to be applied to the first and second nodes are in phase opposition and the phase angle Θ of the third alternating voltage to be applied to the third node can be given an arbitrary value.

12. A circuit arrangement as claimed in claim 7, characterized in that the sinusoidal fundamental waves of the first and second alternating voltages to be applied to the first and second nodes are in phase opposition and the phase angle Θ of the third alternating voltage to be applied to the third node can be given an arbitrary value.

13. A circuit arrangement as claimed in claim 8, characterized in that the sinusoidal fundamental waves of the first and second alternating voltages to be applied to the first and second nodes are in phase opposition and the phase angle Θ of the third alternating voltage to be applied to the third node can be given an arbitrary value.

14. A circuit arrangement as claimed in claim 2, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node so as to compensate for the influence of this change on the voltages to be applied to the windings.

15. A circuit arrangement as claimed in claim 3, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

16. A circuit arrangement as claimed in claim 4, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

17. A circuit arrangement as claimed in claim 5, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

18. A circuit arrangement as claimed in claim 7, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

19. A circuit arrangement as claimed in claim 8, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

20. A circuit arrangement as claimed in claim 9, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

21. A circuit arrangement as claimed in claim 10, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

22. A circuit arrangement as claimed in claim 11, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

23. A circuit arrangement as claimed in claim 12, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

24. A circuit arrangement as claimed in claim 13, characterized in that a compensation voltage is superposed on each of the first and second alternating voltages to be applied to the first and second nodes, which compensation voltage corresponds to the change of the voltage waveform caused by the insertion of the constant levels ($+Uq$, $-Uq$) into the third voltage to be applied to the third node, so as to compensate for the influence of this change on the voltages to be applied to the windings.

* * * * *